Oct. 18, 1932.   C. BREER   1,883,522

PISTON RING TESTING MACHINE

Filed Feb. 11, 1928

INVENTOR
CARL BREER.
BY
*Jhing Harness*
ATTORNEY

Patented Oct. 18, 1932

1,883,522

UNITED STATES PATENT OFFICE

CARL BREER, OF DETROIT, MICHIGAN, ASSIGNOR TO CHRYSLER CORPORATION, OF DETROIT, MICHIGAN, A CORPORATION OF DELAWARE

PISTON RING TESTING MACHINE

Application filed February 11, 1928. Serial No. 253,566.

This invention relates to a piston ring testing machine and more particularly to a machine for testing the angle of the periphery of a sealing surface such as the outer periphery of a piston ring.

It is important, in the manufacture of piston rings, to have the outer periphery of the piston ring cylindrical and parallel to the axis of its support, or the piston, so that the entire outer periphery of the ring engages the cylinder wall.

It is therefore an important object of this invention to provide means for testing the outer periphery of the ring to determine whether or not the ring has a maximum engaging surface with the cylinder wall.

Another object of the invention is to provide a means for determining the amount of inaccuracy of the ring by an accurate and inexpensive method.

Other objects and advantages will more fully appear from the following description taken in connection with the accompanying drawing, in which.

Figure 1:
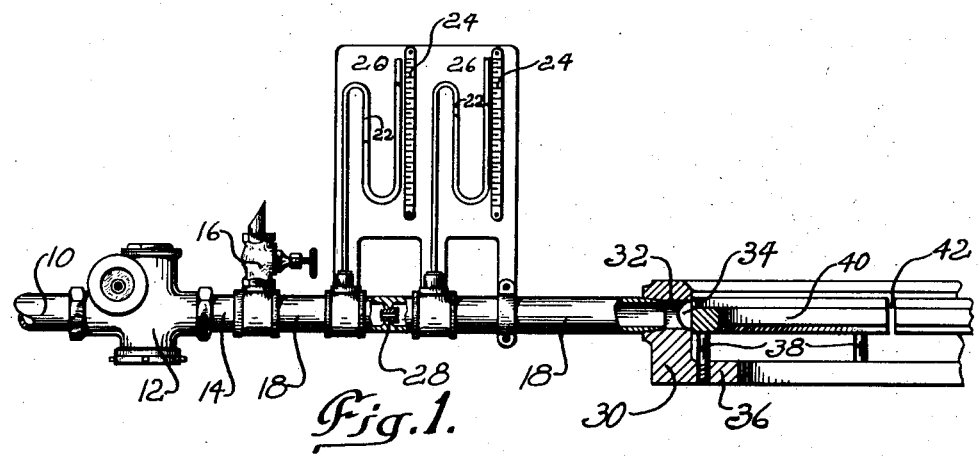
Fig. 1 is a diagrammatic view of the testing mechanism illustrating the application of one form of the device to a piston ring, the latter and its receiving member being broken away and shown in section.
Figure 2:
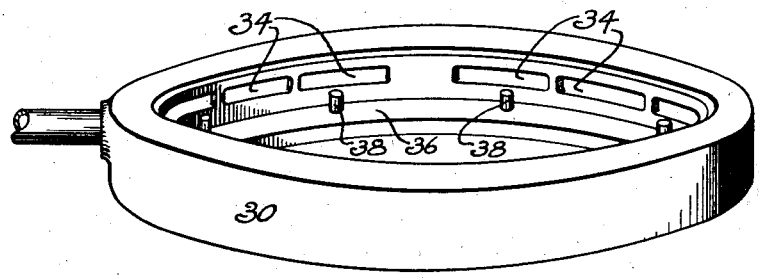
Fig. 2 is a perspective view of the ring receiving member.

Referring to the drawing, and particularly to Fig. 1, I have shown a conduit 10 adapted to form a passage from an air pressure chamber, not shown, to an adjustable reduction valve 12. A conduit 14 is connected to the opposite or outlet side of the reduction valve 12 and is provided with a relief valve 16 which may be adjusted to relieve the pressure in the conduit 14. A conduit 18 is extended beyond the pressure relief valve 16 and a mercury gauge 20, in the form of a U tube 22 supporting a column of mercury adjacent a gauge 24, is in communication with the conduit 18 through which a fluid passes such as air. This gauge 20 has been provided for indicating the amount of pressure at this point and it is to be understood that other gauges or means for indicating the pressure may be substituted. Another gauge 26 has been provided beyond the gauge 20. The gauges 20 and 26 have been shown alike. A fixed orifice 28 has been provided between the two gauges to restrict the passage therebetween.

The outer end of the conduit 18 is received in a ring supporting member 30. This member is formed to enclose the ring and is provided with an annular cored passage 32 in communication with the passage through the conduit 18. The inner wall of the supporting member 30 is provided with a plurality of openings 34 which permit exhausting of the fluid in the conduit 18 and passage 32. An inwardly extending flange 36 at the lower edge of the supporting member 30 receives pins 38 which are screw-threaded into the flange 36 for the purpose of vertical adjustment. These pins 38 receive the lower edge of a piston ring and support it in such a position that its outer periphery covers the openings 34. It will be understood that the piston ring 40 selected for illustrating an embodiment of my invention is resilient and split as at 42 and that when pressed into the supporting member 30 it is slightly compressed conforming to the inner periphery of the supporting member 30, closing the openings 34.

Figure 3:
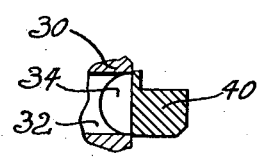
Fig. 3 is a diagrammatic view, in section, showing a perfect sealing ring.
Figure 4:
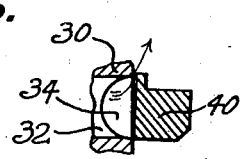
Fig. 4 is a similar view, showing an imperfect ring.

If the outer periphery of the ring 40 is vertical, or parallel to its axis, the openings 34 are entirely closed, as shown in Fig. 3, and the fluid under pressure in the conduit 18 is not permitted to escape. The pressure in the conduit 18 to the right of the orifice 28 is then built up substantially to the pressure in the conduit 18 to the left of the orifice, the pressure at the respectively opposite sides of the orifice being indicated on the gauges 20 and 26. If the outer periphery of the ring 40 is not vertical, as shown in Fig. 4, the fluid in the portion of the conduit 18 to the right of the orifice 28 escapes from the openings 34 through the space which is present under these conditions between the outer periphery of the ring and the inner periphery of the supporting member 30, causing the pressure in the conduit 18 to the right of the orifice to be lower than the pressure on the opposite side of the orifice.

As an example of the pressures used with the device illustrated, 60 to 80 pounds pressure is applied to the conduit 10. This pressure is reduced to approximately five pounds, by the reduction valve 12, and the relief valve is adjusted to reduce that five pounds pressure to about three pounds, which pressure may be indicated on the gauge 20. A perfect sealing ring will cause the pressures on each side of the orifice 28 to balance and the gauges 20 and 26 will read the same, but if the ring is not a perfect seal the pressures will not balance and the difference in pressures will be indicated, which difference will be in direct proportion to the leak of the fuel past the ring.

It is to be understood that various changes in the size and arrangement of parts may be made without departing from the spirit of my invention and it is not my intention to limit its scope other than by the terms of the appended claims.

What I claim is:

1. A piston ring testing device including a conduit having one end communicating with a source of fluid pressure, an annular body at the outlet of said conduit having circumferentially arranged normally open exhaust ports adapted to be closed by a piston ring, a restriction in said conduit, and a pair of pressure gauges, one for indicating the pressure in said conduit on each side of said restriction.

2. A device of the class described comprising, a conduit adapted for communication with a pressure supply, a piston ring supporting member at the outlet end of said conduit having an annular passage and a plurality of radially extending openings communicating with said conduit, means for positioning a piston ring with its outer periphery over the openings in said support, a restriction within said conduit, and means for indicating the pressure in said conduit at opposite sides of said restriction.

3. In a device for testing the pressure sealing capacity of a substantially cylindrical article, an annular support having an annular passage therein and including a cylindrical inner wall having ports communicating with said passage and adapted to be closed by said article, means for feeding fluid under a constant pressure to said passage, and a pair of pressure gauges, one for indicating the pressure of the fluid before it is admitted into said passage and the other for indicating the fluid pressure in said passage.

4. In a device for testing the pressure sealing capacity of a piston ring, a conduit having one end communicating with a source of fluid under substantially constant pressure, an annular casing having an inner cylindrical wall adapted to retain a piston ring under compression, said wall having a port therein communicating with said conduit and normally with the atmosphere, and adapted to be closed by said piston ring, a pair of pressure indicating devices, one for indicating the pressure at said source and the other for indicating the pressure in said conduit, and a restriction in said conduit between said gauges, a variance in pressure on said gauges normally indicating a leakage of fluid from said passage past said ring.

5. In a device for testing the pressure sealing capacity of a piston ring, a cylindrical member having an annular passage therein, a vertical wall on the inner periphery of said cylindrical member having radial openings therein communicating with the annular passage in said cylindrical member, supporting means within the inner periphery of said vertical wall for supporting a piston ring with its outer periphery in sealing contact with said vertical wall, and means for supplying a fluid pressure to the annular passage in said cylindrical member.

CARL BREER.